US010776309B2

(12) United States Patent
Pal et al.

(10) Patent No.: US 10,776,309 B2
(45) Date of Patent: Sep. 15, 2020

(54) METHOD AND APPARATUS TO BUILD A MONOLITHIC MESH INTERCONNECT WITH STRUCTURALLY HETEROGENOUS TILES

(71) Applicant: Intel Corporation, Santa Clara, CA (US)

(72) Inventors: Rahul Pal, Bangalore (IN); Ishwar Agarwal, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 746 days.

(21) Appl. No.: 15/396,522

(22) Filed: Dec. 31, 2016

(65) Prior Publication Data
US 2018/0189232 A1    Jul. 5, 2018

(51) Int. Cl.
H04L 12/50 (2006.01)
G06F 15/80 (2006.01)
G06F 15/173 (2006.01)

(52) U.S. Cl.
CPC ........ G06F 15/80 (2013.01); G06F 15/17381 (2013.01)

(58) Field of Classification Search
None
See application file for complete search history.

(56) References Cited

U.S. PATENT DOCUMENTS

| | | | | |
|---|---|---|---|---|
| 7,787,361 B2* | 8/2010 | Rahman | ............... | H04W 40/26 370/217 |
| 8,045,546 B1* | 10/2011 | Bao | ..................... | H04L 45/14 370/386 |
| 8,978,003 B1* | 3/2015 | Fu | ......................... | G06F 30/392 716/122 |
| 9,886,275 B1* | 2/2018 | Carlson | ............... | H01L 25/0657 |
| 2009/0274157 A1* | 11/2009 | Vaidya | .................... | H04L 45/04 370/400 |
| 2010/0077367 A1* | 3/2010 | Nitta | ....................... | G06F 30/39 716/106 |
| 2014/0267262 A1* | 9/2014 | Masry | ..................... | G06T 17/20 345/423 |
| 2015/0006776 A1* | 1/2015 | Liu | ................... | G06F 15/17381 710/113 |
| 2015/0026494 A1* | 1/2015 | Bainbridge | ............. | G06F 1/324 713/322 |
| 2015/0208329 A1* | 7/2015 | Wirola | .................. | H04W 48/16 370/338 |
| 2015/0373735 A1* | 12/2015 | Thubert | .................. | H04W 4/90 370/310.1 |
| 2016/0299874 A1* | 10/2016 | Liao | ......................... | G06F 17/16 |
| 2018/0006961 A1* | 1/2018 | Guibene | ............... | H04W 40/04 |

* cited by examiner

Primary Examiner — Brandon M Renner
(74) Attorney, Agent, or Firm — NDWE, LLP

(57) ABSTRACT

A hetero-mesh architecture is provided to enable varying densities of tile in a multi-core processor. The hetero-mesh architecture includes areas with different tile sizes and wire densities operating and different bandwidths. A split merge switch is utilized between the different parts of the hetero-mesh to enable the sending of packets from tiles in one area of the hetero-mesh to another area of the hetero-mesh while employing a single end to end communication protocol.

20 Claims, 13 Drawing Sheets

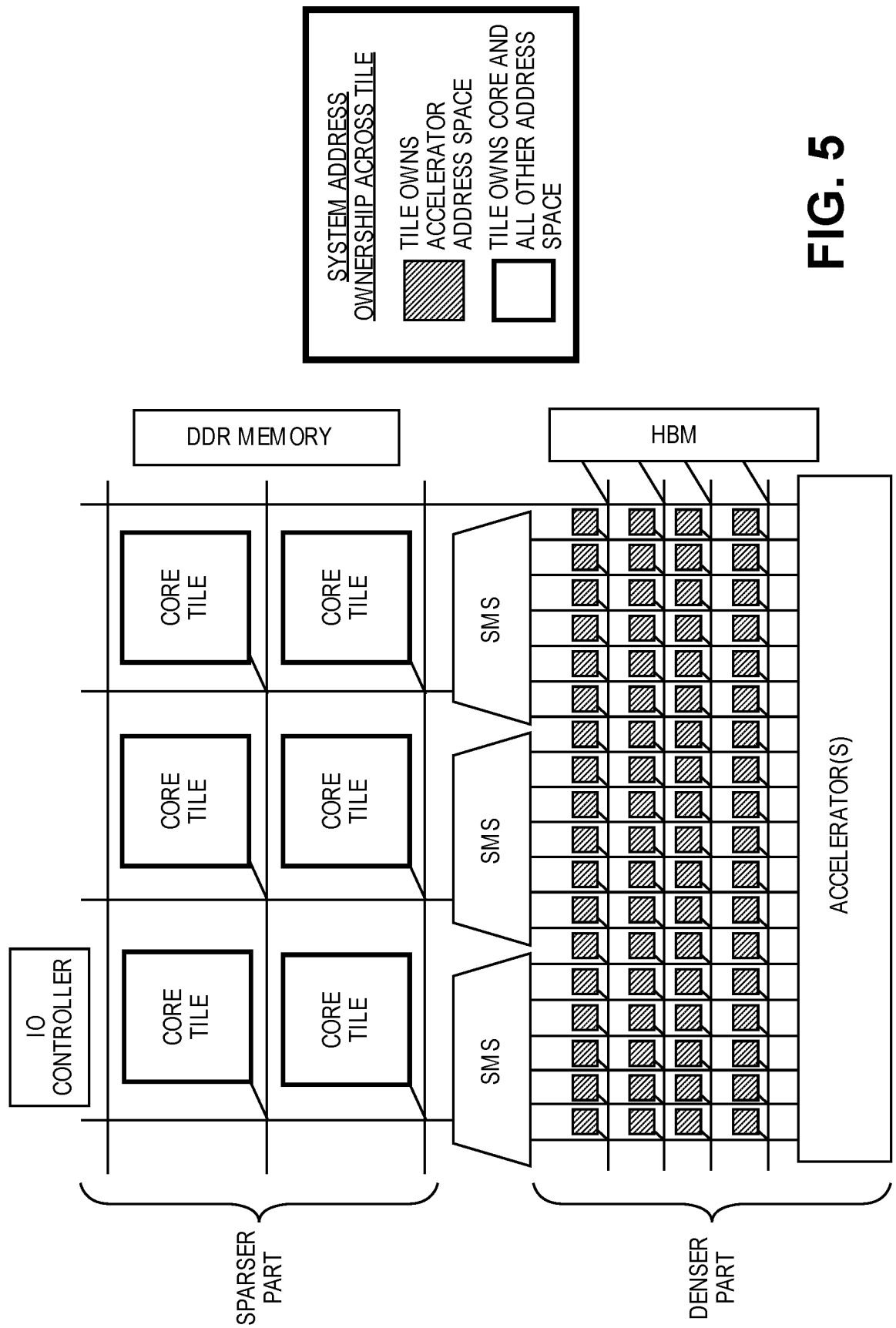

METHOD AND APPARATUS TO BUILD A MONOLITHIC MESH INTERCONNECT WITH STRUCTURALLY HETEROGENOUS TILES

TECHNICAL FIELD

Embodiments of the invention relate to the field of computing systems; and more specifically, (but not exclusively) to multi-core processor interconnect architectures.

BACKGROUND

Processor chips are utilized in computing devices to execute the functions and operations coded in programs for the respective computing device. Such computing devices include personal computers, servers handheld devices, console devices and similar computing devices. Processor chips have evolved from having a single execution core, or simply 'core,' to having multiple cores within the same chip or closely interconnected. The availability of multi-core chips has enabled parallel computing, where multiple instructions can be executed in parallel by each of the cores at the same time. This increases the computing throughput of the processor chips and functionality within computing devices that they support.

Each core can be an independent central processing unit (CPU) capable of reading program instructions from a memory device and executing these program instructions. Dual-, quad-, and even hexa-core processors have been developed for personal computing devices, while high performance server chips have been developed with upwards of ten, twenty, and more cores. Cores can be interconnected to one another and with other on-chip components utilizing an on-chip interconnect of wire conductors or other transmission media. Scaling the number of cores on a chip can challenge chip designers seeking to facilitate high-speed interconnection of the cores. A variety of interconnect architectures have been developed including ring bus interconnect architectures, among other examples.

BRIEF DESCRIPTION OF THE DRAWINGS

The invention may best be understood by referring to the following description and accompanying drawings that are used to illustrate embodiments of the invention. In the drawings:

FIG. 5 is a diagram of one example architectural usage of the hetero-mesh.

DETAILED DESCRIPTION

Figure 1:
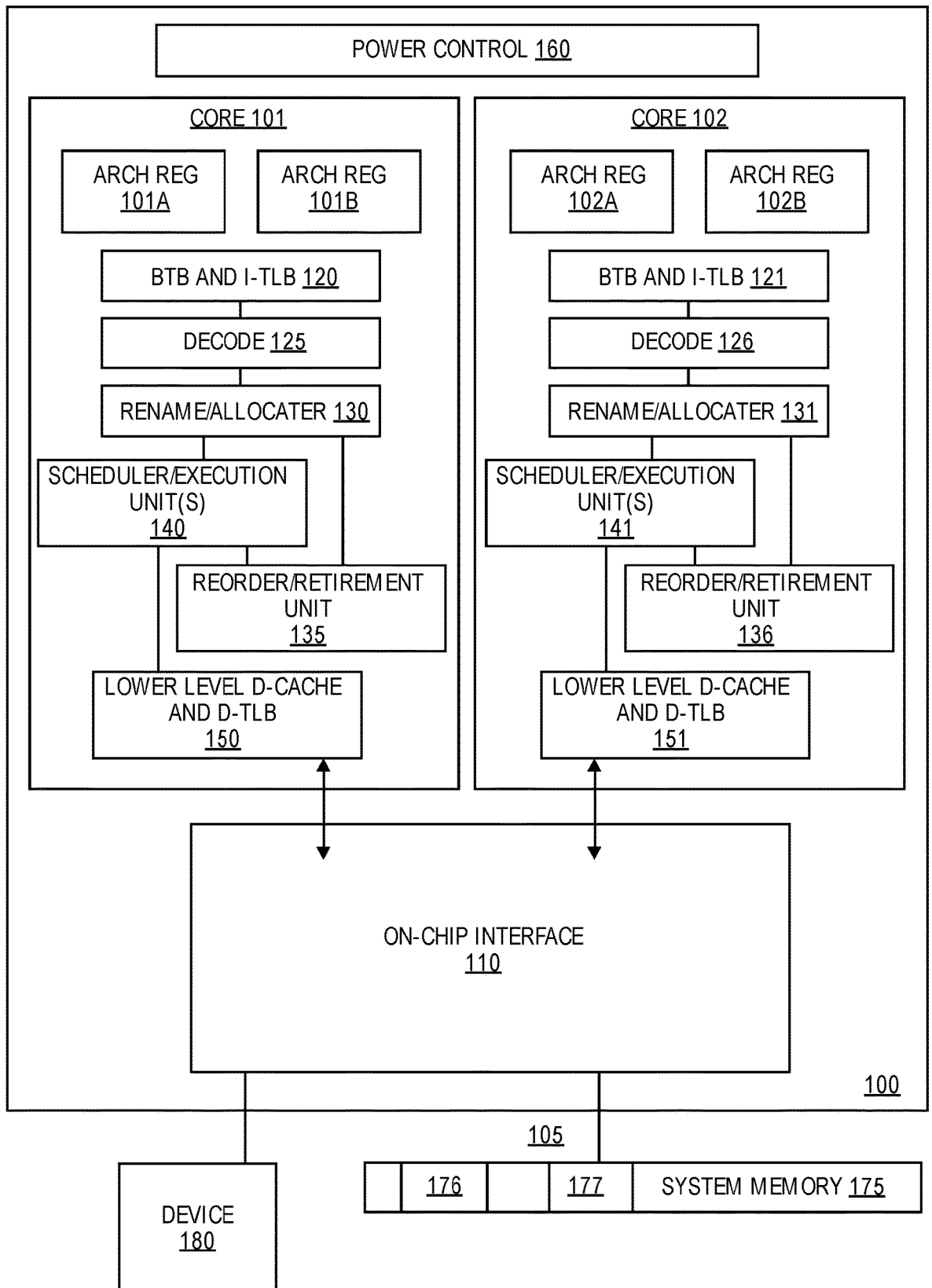
FIG. 1 is a diagram of one embodiment of a computing system with a multicore processor.

The following description describes methods and apparatus for a mesh interconnect supporting a structurally heterogenous set of tiles. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Multi-Core Processor Architecture

FIG. 1 is a diagram of one embodiment of a computing system with a multicore processor. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast, to cores, a hardware thread typically refers to any logic located on an integrated circuit capable of maintaining an independent architectural state, wherein the independently maintained architectural states share access to execution resources. When certain resources are shared and others are dedicated to an architectural state, the line between the nomenclature of a hardware thread and core overlaps. A core and a hardware thread are viewed by an operating system as individual logical processors, where the operating system is able to individually schedule operations on each logical processor.

Physical processor 100, as illustrated in FIG. 1, includes two cores—core 101 and 102. Core 101 and 102 can be considered symmetric cores, i.e. cores with the same configurations, functional units, and/or logic circuits. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core types. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

In the illustrated example embodiment, core 101 includes two hardware threads 101A and 101B, which may also be referred to as hardware thread slots 101A and 101B. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101A, a second thread is associated with architecture state registers 101B, a third thread may be associated with architecture state registers 102A, and a fourth thread may be associated with architecture state registers 102B. Here, each of the architecture state registers (101A, 101B, 102A, and 102B) may be referred to as processing elements, thread slots, or thread units, as described above. As illustrated, architecture state registers 101A are replicated in architecture state registers 101B, so individual architecture states/contexts are capable of being stored for logical processor 101A and logical processor 101A. In cores 101, 102, other smaller resources, such as instruction pointers and renaming logic in allocator and renamer block 130, 131 may also be replicated for threads 101A and 101B and 102A and 102B, respectively. Some resources, such as re-order buffers in reorder/retirement unit 135, 136, ILTB 120, 121, load/store buffers, and queues may be shared through partitioning. Other resources, such as general purpose internal registers, page-table base register(s), low-level data-cache and data-translation buffer (TLB) 150, 151 execution unit(s) 140, 141 and portions of out-of-order unit are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. In the example illustrated embodiment, core 101 includes a simplified, representative out-of-order (OOO) processor core. But an in-order processor may be utilized in different embodiments. The OOO core includes a branch target buffer (BIB) 120 to predict branches to be executed/taken and an instruction-translation buffer (I-TLB) 120 to store address translation entries for instructions.

Core 101 further includes decode module 125 coupled to fetch unit to decode fetched elements. Fetch logic, in one embodiment, includes individual sequencers associated with thread slots 101A and 101B, respectively. Core 101 may be associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example embodiment, allocator and renamer block 130 includes an allocator to reserve resources, such as register files to store instruction processing results. However, threads 101A and 101B are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating-point instruction is scheduled on a port of an execution unit that has an available floating point execution unit. Register files associated with the execution units are also included to store information instruction processing results. Exemplary execution units include a floating-point execution unit, an integer execution unit, a jump execution unit, a load execution unit, a store execution unit, and other known execution units.

Lower level data cache and data translation buffer (D-TLB) 150 are coupled to execution units) 140. The data cache may store recently used/operated on elements, such as data operands, which are potentially held in memory coherency states. The D-TLB may store recent virtual/linear to physical address translations. As a specific example, a processor may include a page table structure to break physical memory into a plurality of virtual pages.

In the illustrated example embodiment, cores 101 and 102 share access to higher-level or further-out cache, such as a second level cache associated with on-chip interface 110. Note that higher-level or further-out refers to cache levels increasing or getting further way from the execution unit(s). In one embodiment, a higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the illustrated embodiment, processor 100 also includes on-chip interface 110. The on-chip interface 110 may be a memory controller, which is described in more detail below, has been included in a computing system external to processor 100. In this scenario, the on-chip interface 110 may communicate with devices external to processor 100, such as system memory 175, a chipset (often including a memory controller hub to connect to memory 175 and an I/O controller huh to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include dynamic random access memory (DRAM), static random access memory (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

In other embodiments, the devices 180 may be integrated on a single die, such as SOC, and any of these devices may be incorporated with processor 100. For example, in one embodiment, a memory controller hub is on the same package and/or die with processor 100. A portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler programs), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Interconnect Fabric Architecture

Multi-core processors may communicate via an interconnect fabric. Example interconnect fabrics and protocols can include such examples as Peripheral Component Interconnect (PCI) Express (PCIe) architecture, Intel QuickPath Interconnect (QPI) architecture, Mobile Industry Processor Interface (MIPI), among others. A range of supported processors may be reached through use of multiple domains or other interconnects between node controllers.

An interconnect fabric architecture can include a layered protocol architecture. In one embodiment, protocol layers (coherent, non-coherent, and optionally other memory based protocols), a routing layer, a link layer, and a physical layer can be provided. Furthermore, the interconnect can include enhancements related to power managers, design for test and debug (DFT), fault handling, registers, security, etc.

The physical layer of an interconnect fabric, in one embodiment, can be responsible for the fast transfer of information on the physical medium (electrical or optical etc.). The physical link is point to point between two link layer entities. The link layer can abstract the physical layer from the upper layers and provide the capability to reliably transfer data (as well as requests) and manage flow control between two directly connected entities. It also is responsible for virtualizing the physical channel into multiple virtual channels and message classes. The Protocol layer can rely on the link layer to map protocol messages into the appropriate message classes and virtual channels before handing them to the physical layer for transfer across the physical links. Link layer may support multiple messages, such as a request, snoop, response, writeback, non-coherent data, etc.

In some implementations, a link layer can utilize a credit scheme for flow control. Non-credited flows can also be supported. With regard to credited flows, during initialization, a sender is given a set number of credits to send packets or flits to a receiver. Whenever a packet or flit is sent to the receiver, the sender decrements its credit counters by one credit which represents either a packet or a flit, depending on the type of virtual network being used. Whenever a buffer is freed at the receiver, a credit is returned back to the sender for that buffer type. When the sender's credits for a given channel have been exhausted, in one embodiment, it stops sending any flits in that channel. Essentially, credits are returned after the receiver has consumed the information and freed the appropriate buffers.

In one embodiment, a routing layer can provide a flexible and distributed way to route packets from a source to a destination. In some platform types (for example, uniprocessor and dual processor systems), this layer may not be explicit but could be part of the link layer; in such a case, this layer is optional. It relies on the virtual network and message class abstraction provided by the link layer as part of the function to determine how to route the packets. The routing function, in one implementation, is defined through implementation specific routing tables. Such a definition allows a variety of usage models.

In one embodiment, protocol layer can implement the communication protocols, ordering rule, and coherency maintenance, I/O, interrupts, and other higher-level communication. Note that protocol layer, in one implementation, can provide messages to negotiate power states for components and the system. As a potential addition, physical layer may also independently or in conjunction set power states of the individual links.

Multiple agents may be connected to an interconnect architecture, such as a home agent (orders requests to memory), caching (issues requests to coherent memory and responds to snoops), configuration (deals with configuration transactions), interrupt (processes interrupts), legacy (deals with legacy transactions), non-coherent (deals with non-coherent transactions), and others.

Processors continue to improve their performance capabilities and, as a result, demand more bandwidth per core. These advancements further test interconnect architectures in that latency of the multi-core system can suffer as additional cores are added to an on-chip design. A variety of architectures have been developed in anticipation of the growth in core performance and count, although some solutions are limited in their ability to scale to growing numbers of cores sharing bandwidth provided through the interconnect. In one example, ring interconnect architectures have been utilized and corresponding protocols and policies have been developed within some environments. Although traditional ring architectures have been successful implemented in some systems, scaling a ring interconnect architecture (e.g., beyond ten cores) and in multiple dimensions has proven difficult.

As an example, servers (e.g., Intel Xeon Servers) have used IA cores as on-die processing engines. To meet the bandwidth demand of multiple cores new generation of Xeon processors are employing an on-die interconnect based on the mesh of rings. The mesh of rings (which is an example of a mesh architecture) is based on a regular tile based architecture as illustrated in FIG. 2A.

Figure 2A:
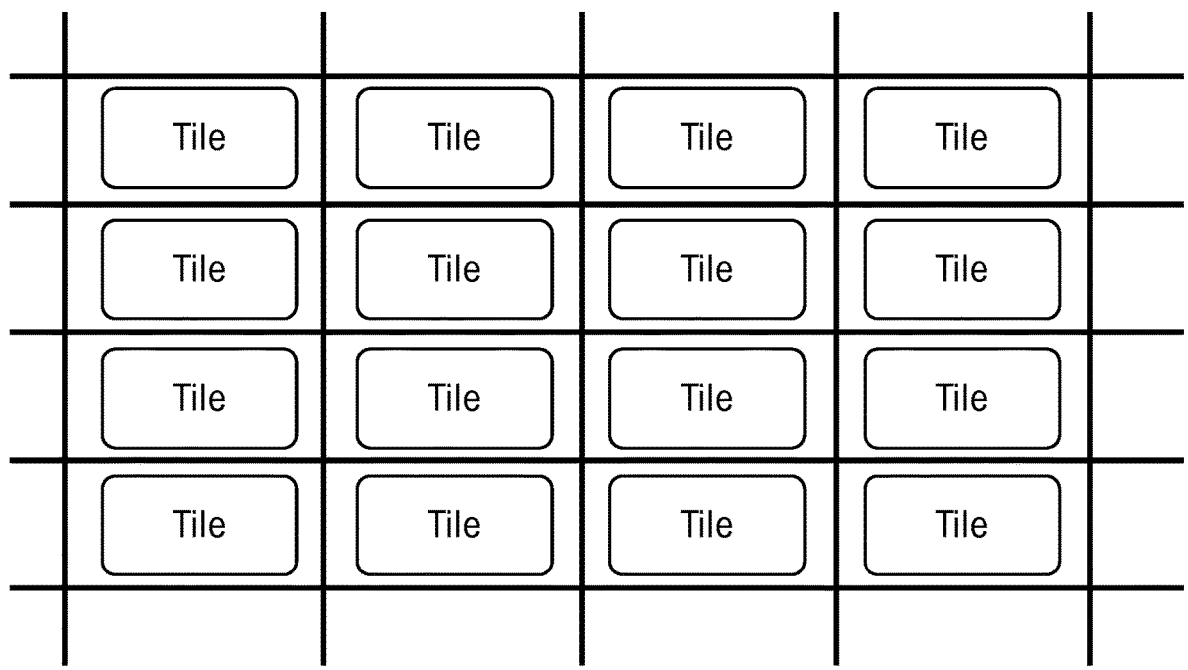
FIG. 2A is a diagram of one example embodiment of a mesh architecture topology.

FIG. 2A is a diagram of one example embodiment of a mesh architecture topology. The mesh architecture topology is a set of interconnects and tiles in a regular grid arrangement. Regular in this context relates to the tiles and interconnects being the same or symmetric. Communication using this mesh architecture uses physical layer and higher protocols that route packets between the tiles in a ring like pattern. Thus, the mesh architecture topology and its use can be referred to as a mesh of rings. The basic building block of the mesh of rings is the core tile. This core tile includes a core, a last level cache (LLC) and a caching agent (CA) which controls coherency for the distributed address space owned by the tile and includes an outstanding request tracking buffer (TOR—Table of Requests) and other mesh buffers. As more cores get added to the mesh architecture, increasing the number of core tiles, the mesh grows in rows and/or columns thus adding more wires to increase the interconnect wire bandwidth. Since each tile comes with an LLC, the cache size also grows with the number of cores to protect the memory bandwidth. The TOR capacity also increases with more tiles to service an increased memory bandwidth. Such a topology provides a scalable way to distribute the bandwidth across multiple links of the mesh, multiple pipelines of the shared distributed LLC and across multiple shared buffers. Components like integrated memory and I/O controllers, QPI links and similar components are usually connected at the edges of the mesh. The cores tiles are usually the largest and most populous components on the mesh architecture and largely determine the number of rows and columns and thus the overall mesh geometry.

Figure 2B:
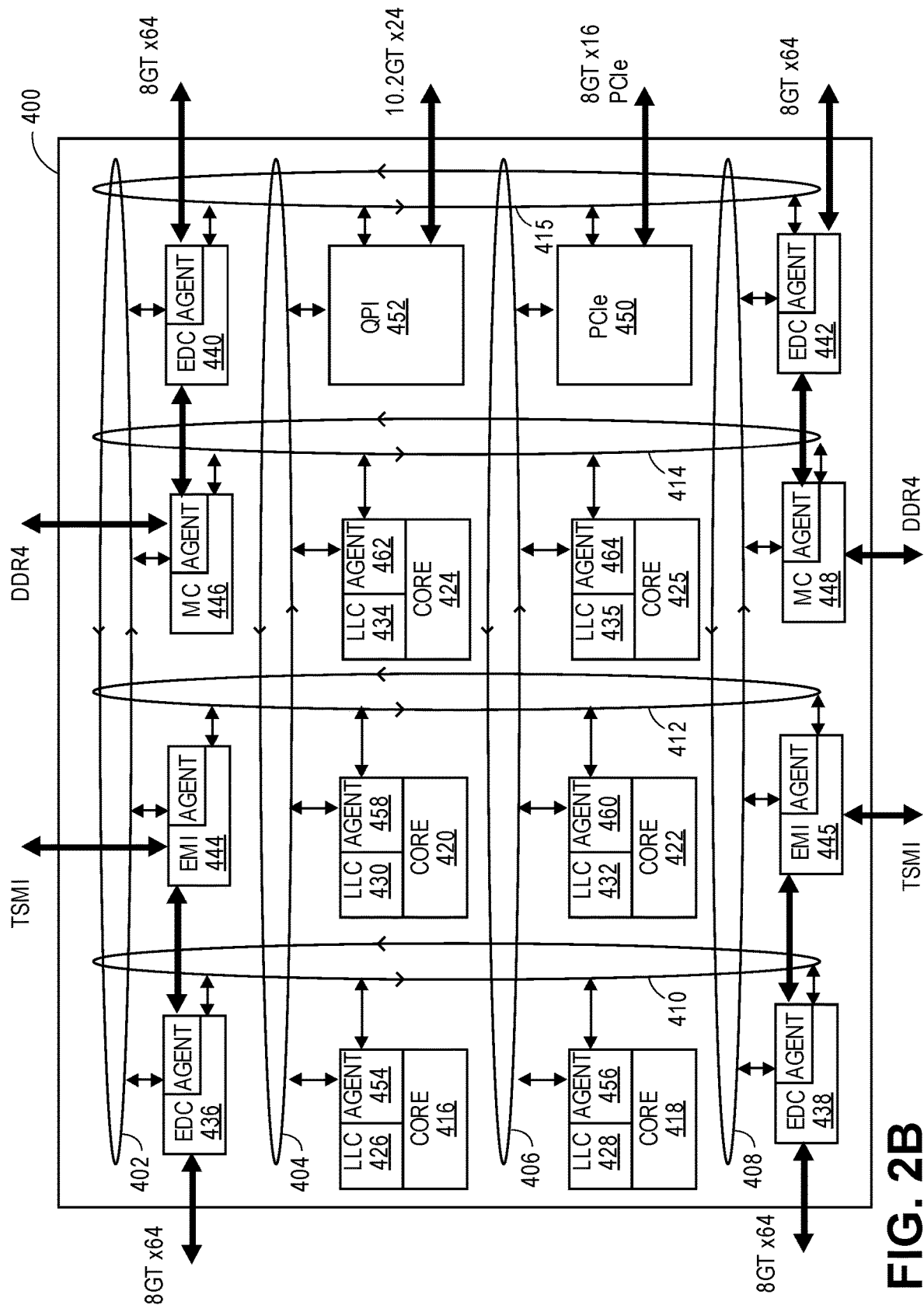
FIG. 2B is an example simplified representation of a regular mesh interconnect architecture including the components of core tiles and the interconnects.

FIG. 2B is an example simplified representation of a regular mesh interconnect architecture including the components of core tiles and the interconnects. A chip 400 or similar die or circuit includes a mesh of horizontally-oriented (relative to the angle of presentation in FIG. 2B) ring interconnect segments 402, 404, 406 and 408 and vertically-oriented ring interconnect segments 410, 412, 414, 415. A set of core tiles are included, at least some of which include processing cores 416, 418, 420, 422, 424, 425 and portions or partitions of a last-level cache (LLC) 426, 428, 430, 432, 434, 435. Additional components, such as memory controllers and memory interfaces, can also be provided such as an embedded DRAM controller (EDC), an external memory controller interface (EMI) (e.g., 444, 445), memory controllers (e.g., 446, 448), and interdevice interconnect components such as a PCIe controller 450 and QPI controller 452, among other examples. Agents (e.g., 454, 456, 458, 460, 462, 464) and other logic circuits can be provided to serve as ring stops for the components, including the core tiles, (e.g., 416, 418, 420, 422, 424, 425, 426, 428, 430, 432, 434, 435, 436, 438, 440, 442, 444, 445, 446, 448, 450, 452) to connect each component to one horizontally oriented ring and one vertically oriented ring. For instance, each tile that corresponds to a core (e.g., 416, 418, 420, 422, 424, 425) can correspond to an intersection of a horizontally oriented ring and a vertically oriented ring in the mesh. For instance, agent 456 corresponding to processing core 422 and the cache box (e.g., 432) of a last level cache segment collocated on the core tile of the processing core 422 can serve as a ring stop for both horizontally oriented ring 406 and vertically oriented ring 412.

A mesh interconnect architecture, such as the ring mesh represented in the example of FIG. 2B, can leverage a ring architecture design and provide more flexibility along with higher performance, among other potential example advantages. Ring stops can send transactions on both a horizontally oriented and a vertically oriented ring. Each ring stop can also be responsible for sinking a message for one ring and injecting to another (i.e., orthogonally oriented) ring. Once injected onto a ring, messages do not stop at each intermediate ring stop but instead progress along the ring until reaching a traverse or destination ring stop. A message, at a traverse ring stop for a particular path, can traverse from a horizontally oriented to a vertically oriented ring (or vice versa). The message can be buffered at this traverse ring stop where it is re-injected onto the mesh (i.e., on another ring), where the message progresses non-stop (i.e., passing over intermediate rings) until it reaches its destination (or another traversal point (e.g., in connection with dynamic re-routing of the message, etc.)).

In some embodiments, the ring stops of the core tiles can be included in connection with an agent (e.g., 454, 456, 458, 460, 462, 464) for the tile. The agent (e.g., 454, 456, 458, 460, 462, 464) can be a combined agent for the core processor and cache bank of a core tile. In one example, the agent can include the functionality of a cache agent managing access to system cache and a home agent managing access to system memory, among other features and functions. In other embodiments, home and cache agents can be provided for separately and distinct from a ring stop connecting the core tile to rings of a ring mesh interconnect, among other examples and implementations.

Figure 2C:
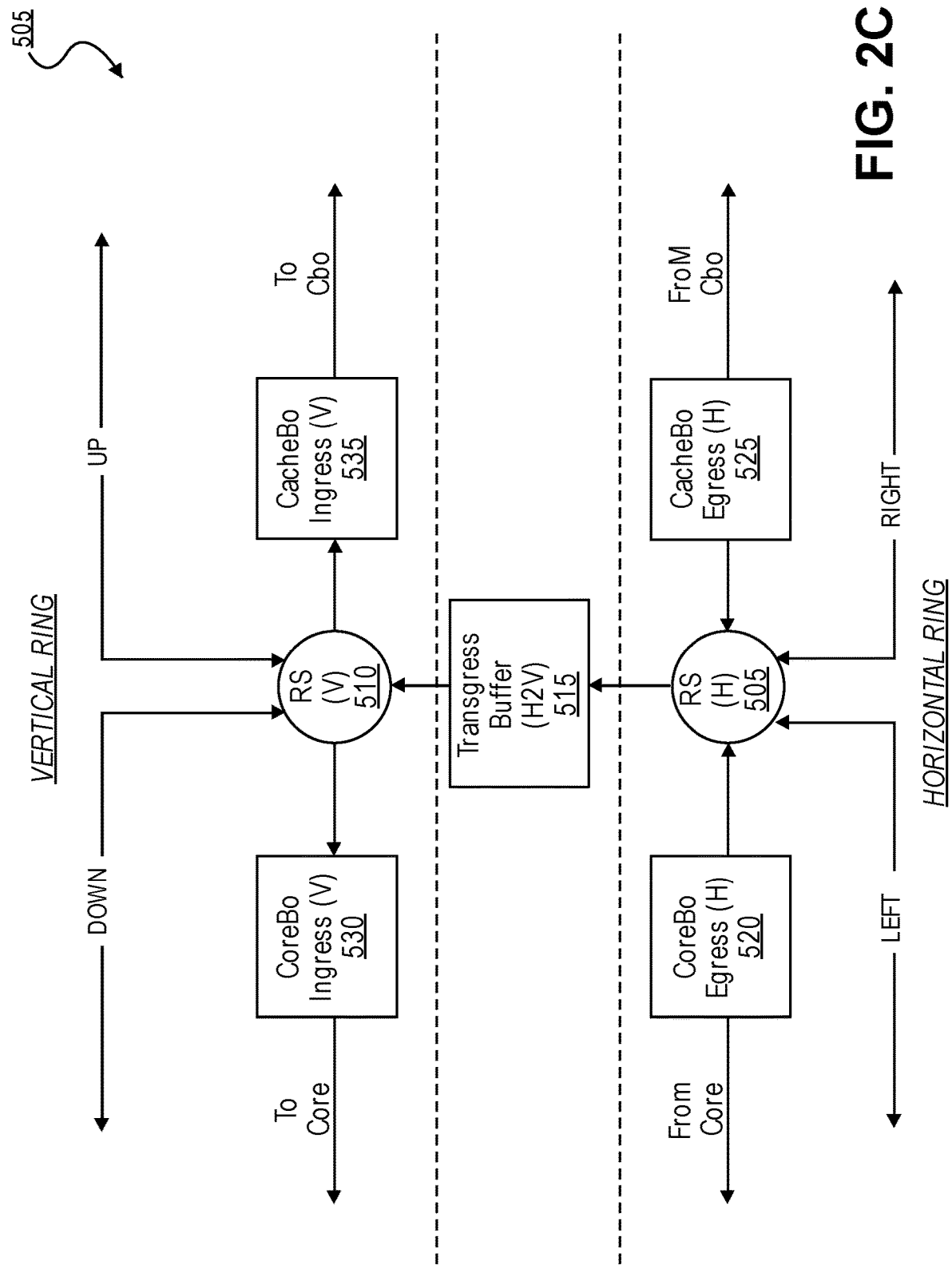
FIG. 2C is a diagram of one embodiment of a simplified block diagram of a ring stop.

FIG. 2C is a diagram of one embodiment of a simplified block diagram of a ring stop. The ring stop 500 for use in an example ring mesh architecture. In the particular example of FIG. 2C, the ring stop 500 includes a horizontal ring-stop component 505, vertical ring-stop component 510, and transgress buffer 515. Horizontal ring-stop component 505 can include logic for routing, buffering, transmitting, and managing traffic that enters from and exits to the horizontal ring interconnect with which the ring stop agent 500 is connected, vertical ring-stop component 510 can include logic components for the routing and transmission routing buffering, transmitting, and managing traffic that enters from and exits to the vertically-oriented ring interconnect with which the ring stop agent 500 is connected. The transgress buffer 515 can include logic components for transitioning messages from one of the ring interconnects (i.e., the horizontally-oriented or vertically-oriented ring) connected to the ring stop 500 to the other (i.e., the vertically-oriented or horizontally-oriented ring).

In one implementation, transgress buffer 515 can buffer messages transitioning from one ring to the other and manage policies and protocols applicable to these transitions. Arbitration of messages can be performed by the transgress buffer 515 according to one or more policies. In one example, transgress buffer 515 includes an array of credited/non-credited queues to sink ring traffic from one ring and inject the traffic to the other ring connected to the ring stop of a particular tile. The buffer size of the transgress buffer 515 can be defined based on the overall performance characteristics, the workload, and traffic patterns of a particular ring mesh interconnect, among other examples. Further, as messages already on a given ring of the ring mesh are to proceed unimpeded to their destination or transition point, messages already on the ring have priority and the transgress buffer 515 can monitor traffic on the rings to which it is connected and inject traffic when available bandwidth is discovered on the appropriate ring. In one example, transgress buffer 515 can apply anti-starvation policies to traffic arbitrated by the transgress buffer 515. In one example, each transaction can be limited to passing through a given transgress buffer exactly once on its path through the interconnect. This can further simplify implementation of protocols utilized by the transgress buffer 515 to effectively connect or bridge rings within the mesh governed by more traditional ring interconnect policies and protocols, including flow control, message class, and other policies.

In some embodiments, a ring mesh interconnect, such as that described herein, can exhibit improved bandwidth and latency characteristics. In one examples, agents of the interconnect can inject traffic onto a source ring (e.g., onto a horizontal ring in a system with horizontal-to-vertical transitions) as long as there is no pass-through traffic coming from adjacent ring-stops. The priority between the agents for injecting can be round-robin. In a unidirectional design, agents can further inject directly to the sink ring (e.g., a vertical ring in a system with horizontal-to-vertical transitions) as long as there are no packets switching at the transgress buffer (from the horizontal ring to the vertical ring) and there is no pass-through traffic. Agents can sink directly from the sink ring. Polarity rules on the sink ring can guarantee that only a single packet is sent to each agent in a given clock on the sink ring. If there are no packets to sink from the sink ring in a unidirectional design, the agents can then sink from either the transgress buffer (e.g., previously buffered packets from the source ring) or the source ring directly (e.g., through a transgress buffer bypass or other co-located bypass path). In such instances, the source ring does not need any polarity rules as the transgress buffer can be assumed to be dual-ported and can sink two packets every cycle. For instance, a transgress buffer can have two or more read ports and two or more write ports. Further, even packets destined to sink into agents on a source ring can be buffered in the corresponding transgress buffer where desired, among other examples.

Figure 2D:
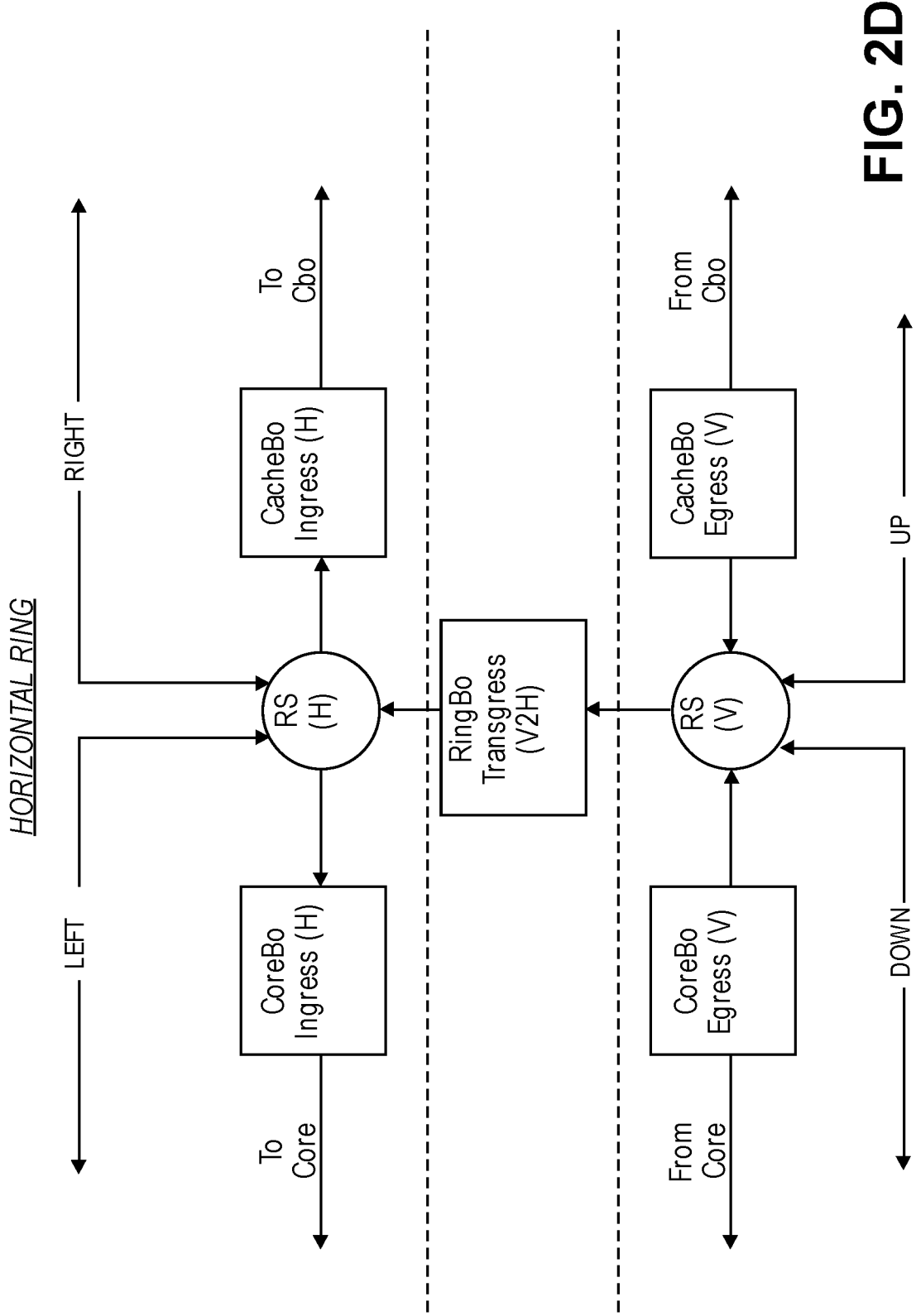
FIG. 2D is a diagram of one embodiment of another block diagram of a ring stop.

In some embodiments, transgress buffer 515 can be bi-directional in that the transgress buffer 515 sinks traffic from either of the horizontally-oriented and vertically-oriented rings connected to the ring stop 500 and inject the traffic on the other ring. In other embodiments, however, transgress buffer 515 can be unidirectional, such as illustrated in the example of FIG. 2C. In this particular example, the mesh transfers from the horizontal ring of a ring stop to the vertical ring of a ring stop. Accordingly, traffic originating from a horizontal ring can be routed through the horizontal ring stop component through the transgress buffer 515 to the vertical ring stop component 510 for injection on the vertical ring connected to the ring stop 500 or for sending to the core box ingress 530 of the core or cache box ingress 535 of the portion of LLC at the tile to which ring stop 500 belongs. Messages sent from the core or cache box of the tile of ring stop 500 can be sent via a core box (or agent) egress (520) or cache box (or agent) egress (525) connected to the horizontal ring stop component 505 in this particular implementation. Further, messages received by the core or LLC of the tile can be handled by the core box ingress 530 or cache box ingress 535 connected to the vertical ring stop component 510. Dedicated connections can be provided from the core and cache boxes and the ring stop 500. While the example of FIG. 2C illustrates one example embodiment according to a unidirectional, horizontal-to-vertical ring transition design, other alternatives can be utilized, such as the bidirectional design introduced above, as well as a unidirectional, vertical-to-horizontal ring transition design illustrated in the example of FIG. 2D.

Figure 2E:
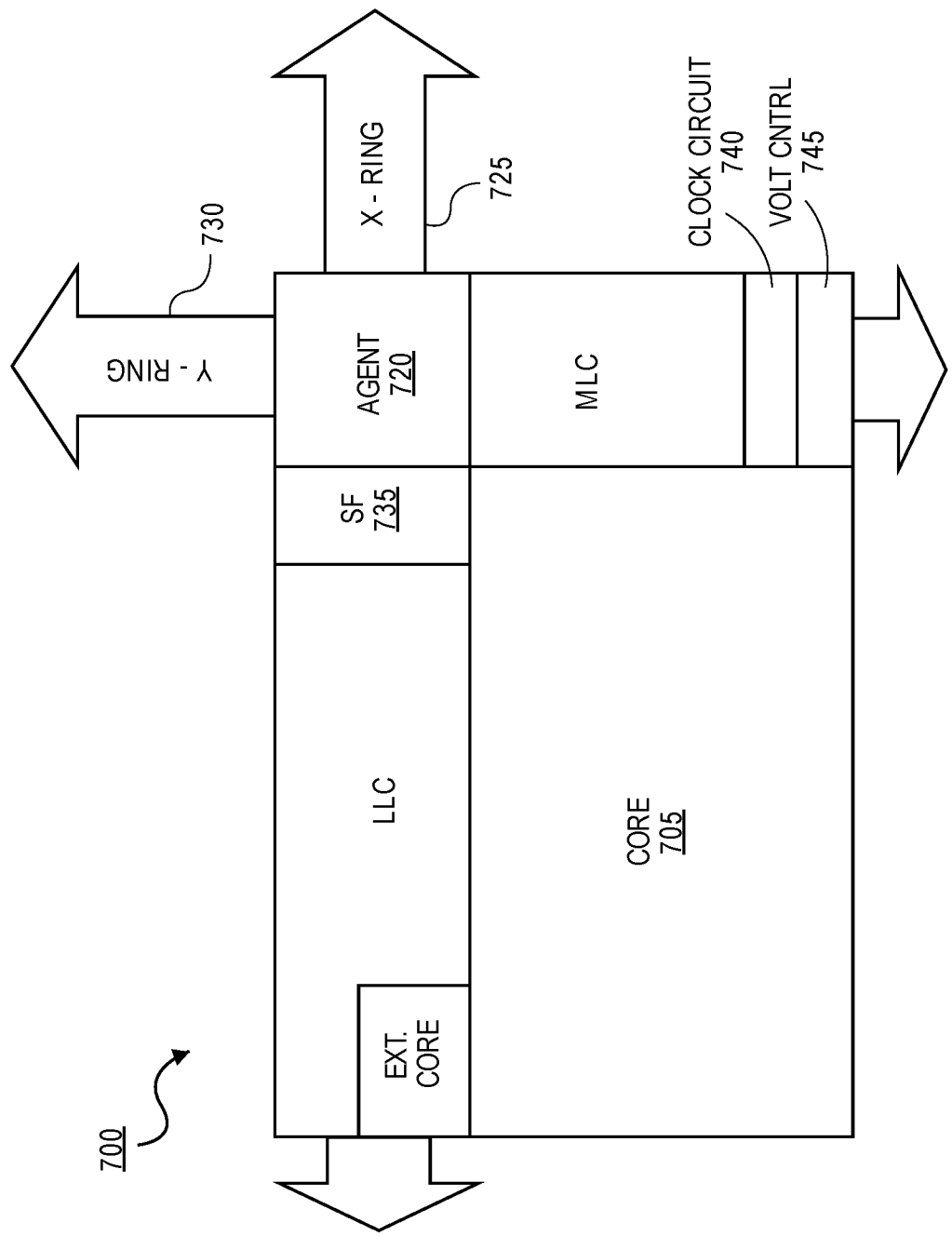
FIG. 2E is a block diagram illustrating a simplified representation of the on-chip layout of a core tile included in a multi-core device utilizing a mesh interconnect.

FIG. 2E is a block diagram illustrating a simplified representation of the on-die layout of a core tile 700 included in a multi-core device utilizing a mesh interconnect. In one example, a core tile 700 can include a processor (CPU) core 705, partition of a cache including a last level cache (LLC) 710 and mid-level cache 715, among other possible components. An agent 720 can be provided including a ring stop positioned to connect to two rings 725, 730 in the mesh. A transgress buffer of the ring stop can permit messages to transition from one of the rings (e.g., 725) to the other of the rings (e.g., 730). Each ring (e.g., 725, 730) can include multiple wires. In some implementations, the on-die wires of the ring mesh can be run on top of or beneath at least a portion of the tiles on the die. Some portions of the core can be deemed "no fly" zones, in that no wires are to be positioned on those portions of the silicon utilized to implement the core. For instance, in the example of FIG. 2E, rings 725, 730 are laid out on the die such that they are not positioned on and do not interfere with the processor core 705. The wire of the rings 725, 730 can instead by positioned over other components on the tile, including LLC 710, MLC 715, and agent 720, among other components on the tile, including for example, a snoop filter 735, clocking logic, voltage regulation and control components (e.g., 745), and even some portions of the core (e.g., 750) less sensitive to the proximity of the wires of a Ting mesh interconnect, among other examples.

Figure 2F:
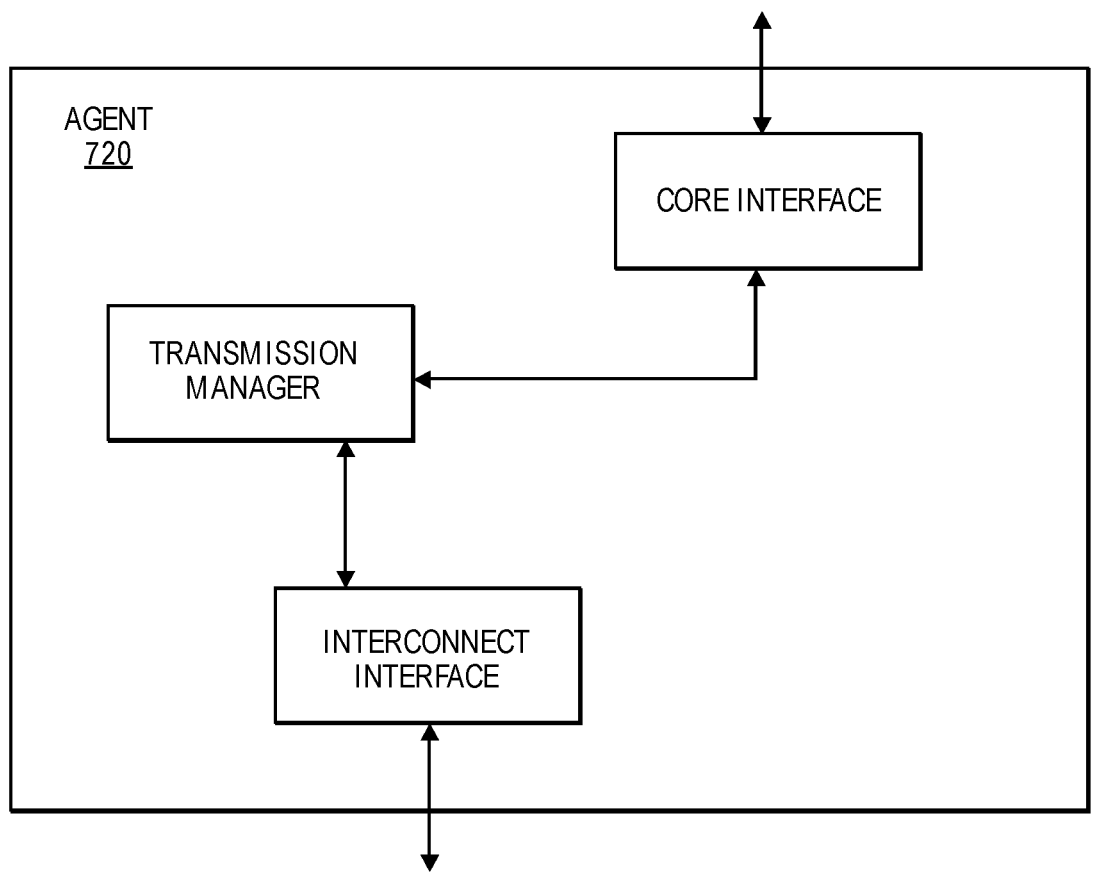
FIG. 2F is a block diagram of one embodiment of an agent.

FIG. 2F is a block diagram of one embodiment of an agent. The agent 720 can have any internal configuration or architecture. The agent 720 can be micro-coded or similarly implemented. The agent 720 can include a core interface to enable communication of data with the core tile and core processor. The agent 720 can include a transmission manager to implement the process for inserting packets into the interconnect as described further herein below. The interconnect interface can manage the direct transmission and receipt of packets from the in-die interconnect or similar interconnect using QPI or IDI packet formats.

Future servers and similar computing devices will include diverse processing elements. For instance, computing devices may include clusters of big and little cores with differing capabilities, or might have IA cores plus integrated accelerator engines for graphics, media, computer vision, networking or other usages. These processing elements are structurally dissimilar in size and geometry. They also have very different latency and bandwidth requirements. For example, big cores executing a single thread may be designed for low latency performance, while applications running on clusters of smaller cores or an accelerator may be designed for very high memory bandwidth usage with higher latency tolerance. While lower latency requires caches that can be quickly accessed like static random access memory (SRAM) caches, higher bandwidth with high latency tolerance may require embedded dynamic RAM (EDRAM), or if this bandwidth is required on a high memory footprint other technologies such as high bandwidth memory (HBM) may be utilized. Servers are increasingly being deployed in virtualized cloud environments. This makes it difficult to anticipate the nature of all the workloads being run on these servers. Performance of different workloads may depend on the performance of any of the different processing units in the computing device. Thus, the computing device needs to integrate these different types of caches and memories to meet the requirements of each processing unit.

These computing devices may have various structurally dissimilar processing units, as well as various structurally dissimilar caches and memories. The interconnect fabric connecting these elements needs to support these structural dissimilarities. The mesh architecture topology is based on homogeneous core tiles and doesn't easily support such structural dissimilarities. Additionally, different levels of bandwidth demand need to be supported by the interconnect fabric connecting each processing element with its caches/memories. This requires either different wire densities or different operating frequencies at the portion of the interconnect connecting these elements.

Some architectures use separate clusters for different processing elements with each cluster containing a specific type of processing element and related caches or memories, each of these clusters has its own exclusive internal interconnect. The clusters are then connected to each other through a different global interconnect that manages the cross-communication between them. Such schemes have the added complexity of managing this 2-tiered interconnect scheme and also maintaining required rates of bandwidth across the various connected clusters.

Hetero-Mesh Architecture Overview

The embodiments improve mesh architecture topologies by introducing a hetero-mesh architecture that utilizes a monolithic mesh, with a single protocol layer running end to end, but supports structurally dissimilar or heterogeneous tiles in different parts of the hetero-mesh. Each part of the hetero-mesh is allowed to have a different mesh wire density, thus allowing it to support a different tile structure. The different wires densities also allow the denser parts to have a higher bandwidth, optionally, the different parts of the hetero-mesh can also run at different clock frequencies to allow more bandwidth flexibility. These parts are connected seamlessly without any interfacing buffers or separate interconnect, the connecting elements are switches only visible at the link layer thus allowing for a monolithic and homogeneous protocol layer. There is only one homogeneous (mesh) protocol running end to end, instead of multiple hierarchical levels of interconnect. The micro-architectural changes required by the hetero-mesh are contained within the ambit of running this single mesh protocol or at lower link layer levels (SMS). This makes the hetero-mesh fabric easier to build and validate thus making it easier to build CPUs with heterogeneous processing elements such as accelerator integrated variants of base CPUs, CPUs with multiple big and little cores. In the hetero-mesh, two agents located in different parts of the mesh can seamlessly communicate with each other at a high bandwidth (equal to the lower bandwidth of the two mesh parts). For example, if the hetero-mesh has two parts one with IA cores and DDR memory and the other with accelerator and HBM, the cross communication may be between HBM and DDR, or Core and HBM, or accelerator and DDR. High bandwidth on such cross communication can enable various usage models for the system e.g. HBM may be used as a cache for DDR memory.

The hetero-mesh architecture interfaces the different parts in a manner that behaves similar to a monolithic mesh of rings. In the mesh of rings architecture only static routing at the source is supported, there are no additional routers in the intermediate stops in the path to the destination. All packets may take at most a single turn to a perpendicular link before reaching their destination. A packet already on a ring link can flow on uninterrupted until it is removed from the ring by the destination or a transgress logic (TL) that transfers the packet to a perpendicular link. New packets requiring insertion must wait for empty slots. The embodiments introduce the SMS to enable the hetero-mesh to achieve the behavior despite the differing densities of the different parts of the hetero-mesh.

Figure 3:
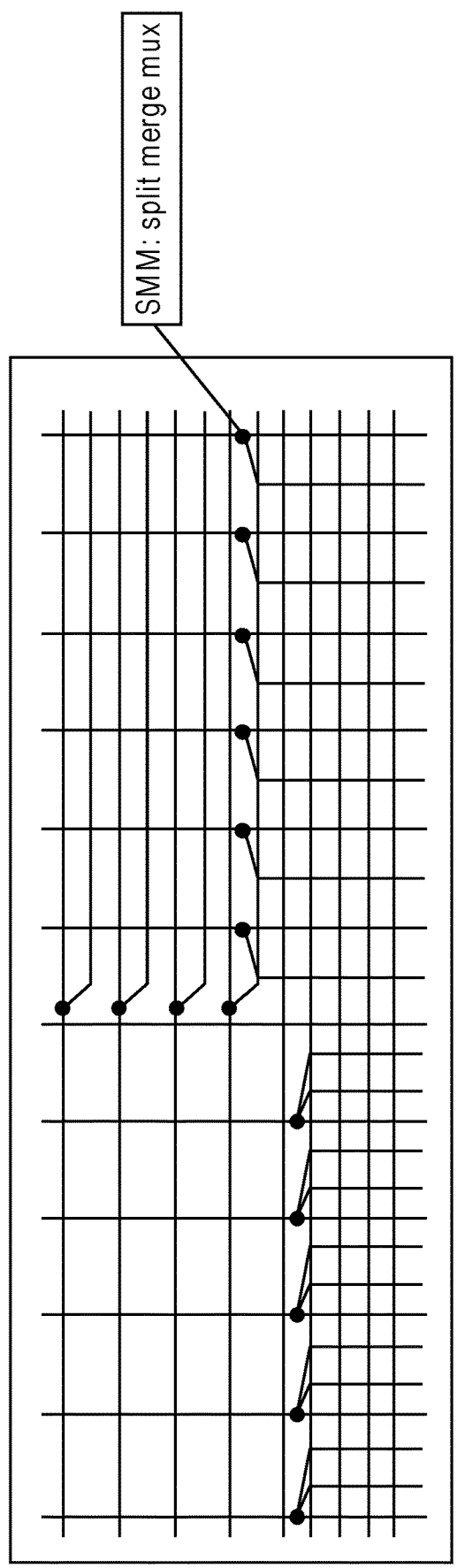
FIG. 3 is a diagram of one embodiment of a hetero-mesh topology.

FIG. 3 is a diagram of one embodiment of a hetero-mesh topology. The hetero-mesh is a monolithic mesh, running a homogeneous protocol end to end, but is composed of structurally heterogeneous tiles in different parts. Each of these parts can thus support different types of processing elements and their associated caches or memories. These parts have different wire densities; thus, a different effective interconnect bandwidth is associated with each of the parts. The hetero-mesh architecture allows all the parts to be at the same mesh clock frequency. The hetero-mesh architecture supports any number of different parts of areas with different density levels and these can accommodate any geometry of components or layouts. Any two adjacent parts of the hetero-mesh are seamlessly connected through link layer components called Split Merge Switch (SMSs).

The hetero-mesh in this example includes four parts each having a different mesh wire density. The mesh tiles in each of these parts are of a size that allows for the corresponding mesh wire geometry in the respective part of the hetero-mesh. At each intersection between the parts of the hetero-mesh in a particular direction a mesh wire from the sparser part is connected to multiple mesh wires in the denser part. The link layer component that facilitates this connection is the SMS. The SMS and bandwidth matching mechanisms for traffic flowing between the parts described in paragraphs below enable the hetero-mesh architecture and form the core of this invention. These mechanisms allow the entire hetero-mesh (all the differing parts) the capability to run at the same clock frequency. This allows even the densest mesh part to be run at the highest clock frequency, not compromising on its bandwidth. In some embodiments, the different parts may be run at different clock frequencies as well by also adding separate clock crossing buffers at each mesh wire between the mesh nodes where the frequency changes.

Figure 4:
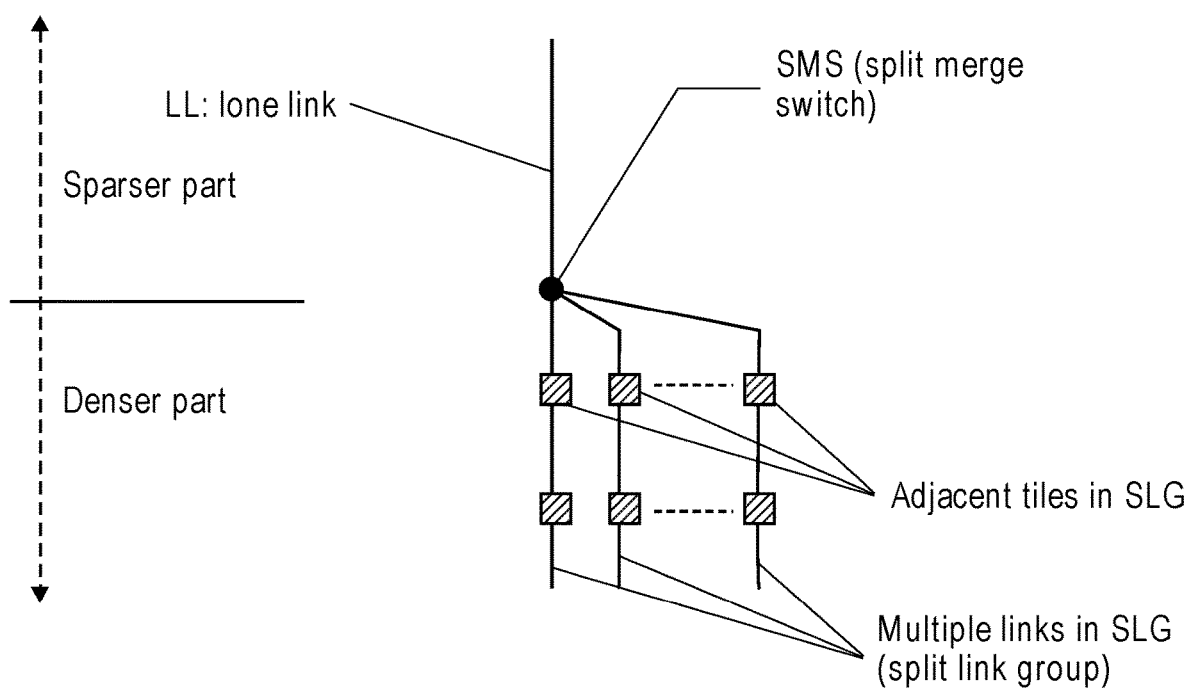
FIG. 4 is a diagram of the wiring of SSMs between different density areas of the hetero-mesh topology.

FIG. 4 is a diagram of the wiring of SMSs between different density areas of the hetero-mesh topology. The SMSs interface connects two parts of a hetero-mesh where the wire densities differ in the dimension connecting the two parts. While the SMS matches the wire densities of the two parts it is a switch that doesn't in itself match the potential bandwidth difference between the two parts. The higher wire density side of the SMS can potentially source traffic at a much higher bandwidth than can be consumed by the lower density side. To compensate for this, a set of switching rules of the SMS determine when incoming traffic from the higher density side should reach the SMS, the source agents in that part of the hetero-mesh must source traffic to ensure its arrival at the SMS at the timing defined by the switching rules. These switching rules described further herein enable bandwidth matching between the different parts of the hetero-mesh.

Internally within each part of the hetero-mesh, the hetero-mesh provides the full bandwidth available as per the wire density and maximum achievable clock frequency. This allows each processor to get tailor made memory bandwidth as per its requirements. The hetero-mesh might often have to be used in conjunction with memory models where each processor can largely or completely limit its access address space to a portion of the memory addresses (which can be called its processor address region or PAR). This may be achieved through either affinization of access addresses or a partitioning of the memory addresses space in a coherent or non-coherent manner by techniques available in current or future operating systems. The hetero-mesh will distribute the addresses within each PAR over the caching agents and memory residing in the same part of the mesh as the respective processor(s).

Each SMS connects one link (LL: lone link) of the sparser part of the hetero-mesh to multiple links of the denser part. The multiple links on the denser part connected to the SMS are referred to as a split link group (SLG). The SMS is positioned between the links on the two parts of the hetero-mesh at a point where no perpendicular link passes through it. The merge logic in the SMS handles transfer of packets from the links in the SLG to the LL. Every cycle the SMS expects to receive at most only one packet from the SLG. Packets arrive in a round robin manner from different links in the SLG, e.g. in an SLG with 2 links, a link 0 packet may only reach the SMS every other cycle, link 1 packets may only reach in the intervening cycles. The merge logic looks for any arriving packet from the assigned round robin link in the SLG and if present passes it to the LL. To achieve this behavior, (refer to FIG. 6A) the agents in adjacent tiles (including TL) in an SLG must stagger the insertion of packets in a round robin manner, i.e. on any cycle only one of these agents can insert (on the link it is located on), the adjacent agent will do so on the next cycle on its link and further agents will similarly wait their turn according to this scheme. These agents need to do this only for packets that have their destination in the other parts of the hetero-mesh, or those that may bounce (not guaranteed to be immediately processed or 'sunk') at the destination and thus may traverse through the SMS and another mesh part before returning. Packets that need to be transferred at high bandwidth between agents within the same mesh part may be credited at the destination so their insertion rate need not be limited in this manner. In some embodiments, the mesh of rings concept of polarity of cycles may be implemented (e.g., Intel's mesh/ring architecture divides cycles into even and odd polarity), then such staggered insertion of packets into the mesh must be per polarity. The merge logic's round robin pointer must also honor all polarities at a split link before moving on to the next link.

The split logic in the SMS handles transfer of packets from the LL to the links in the SLG. When the destination agent tile lies within the SLG, it gets routed to the correct link by the split logic which reads the destination identifier of the packet. When handling packets that are bounceable packets from LL (which may go through the SMS and SLG before returning to the sparser part of the hetero-mesh) the constraints placed by the merge logic's round-robin scheme must be followed. Thus, such bounced packets are placed on that link in the SLG which will return the packet back to the merge logic during its round-robin slot. Also, a source (including TL) (refer to FIG. 6B) on the LL sending a bounceable packet to a destination in the SLG can only insert it on a cycle that ensures that in case of bounce the packet will return to the merge logic during the round robin slot of the link. Bounceable packets are usually new requests from processors to the CA, so the above scenario, where the processor and CA reside in different parts of the hetero-mesh, is not the common use case for the hetero-mesh.

Pass through packets on the SLG (with neither source nor destination identifiers in the SLG) must meet any protocol ordering requirements in choosing the link to traverse. One way of ensuring this is by fixing the split link on which ordered packets, which pass through a SLG between a source destination pair, may traverse. In absence of any ordering requirements pass through packets may be equally interleaved across the split links using an address hash to maintain traffic balance.

Another component that the hetero-mesh may require (depending on usage model) to provide is address range registers (PAR) for each type of processors that are programmable by the operation system (OS) or system software. These registers are used to mark out a portion of the system memory address. Each processor type can be assigned a different address range to use using its PAR. This may be achieved either by memory address affinity (e.g. a non-uniform memory access (NUMA) like affinity) or the partitioning of a memory address range assigned to different processors in a coherent or non-coherent manner. Different techniques to this effect may be supported by a current or future OS. The address range programmed using PAR may be distributed over caching agent tiles in the part of the mesh where the corresponding processors and their caches and memories reside. This enables each processor to bias the communication traffic with its caches/memory to the same mesh part in which they reside.

FIG. 5 is a diagram of one example architectural usage of the hetero-mesh. The hetero-mesh in this example includes two distinct parts. The sparse part is like a traditional ring mesh topology (e.g., of a Xeon server processor) with core tiles that may include an IA core, shared LLC and caching agent (CA) logic circuits, in this example, these core tiles are also connected to traditional DDR memory or similar memory. Each vertical mesh link in the sparse part of the hetero-mesh extends and connects through SMS with multiple vertical links on the dense part of this hetero-mesh.

The dense part of the hetero-mesh is formed of smaller tiles containing only a caching agent (CA), with or without a small cache. The accelerator processing units and HBM (high bandwidth memory) are connected to the dense part of the hetero-mesh. Due to the smaller geometry of these CA tiles, the dense part packs more rows and columns in a given area than the sparse part of the hetero-mesh. The dense part of the hetero-mesh thus provides more mesh wires and CA tiles with TOR buffers in the same area to service the high memory bandwidth and carry it through to the accelerators. The address based distributed tile topology of the mesh provides implicit banking of the TOR and balances traffic across the mesh wires to avoid bandwidth hotspots. Other integrated agents, like I/O or QPI, may also be connected at the edges of the hetero-mesh near the sparse or dense parts as required for the design characteristics of the architecture. The PARs allow the cores in the sparse part to be serviced by LLC and DDR memory while the accelerator(s) may use the HBM for high bandwidth memory access.

Figure 6A:
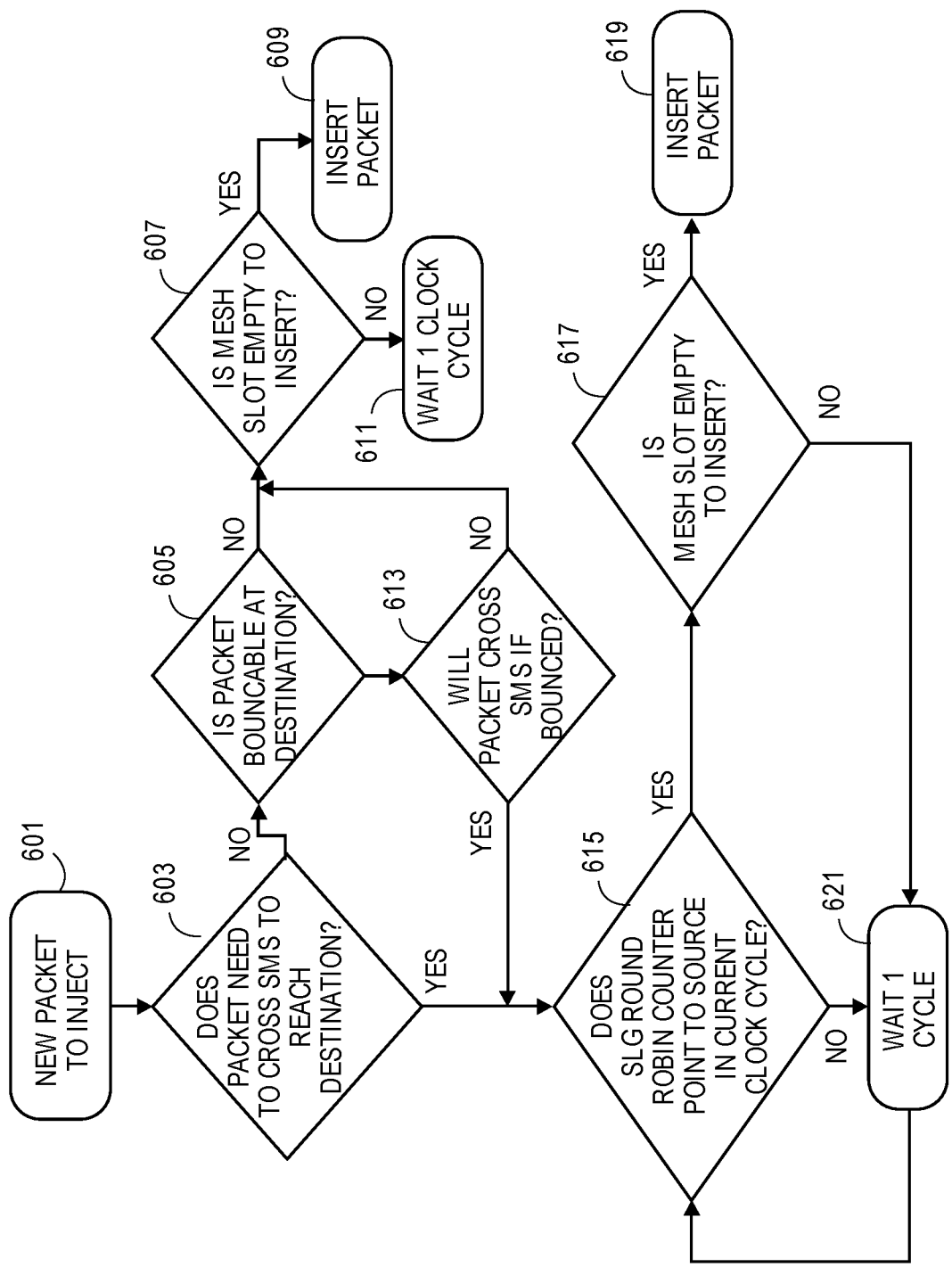
FIG. 6A is a flowchart of one embodiment of a process for a tile sending a message from a denser portion of the hetero-mesh to a less dense portion of the hetero-mesh.

FIG. 6A is a flowchart of one embodiment of a process for a tile sending a message from a denser portion of the hetero-mesh to a less dense portion of the hetero-mesh. The process is initiated when there is a new packet to inject (Block 601). The process can be implemented by an agent or similar component of the sending tile that manages the sending of packets to other cores or components via the mesh interconnect. The agent is responsible for inserting the packet onto the interconnect such that it will arrive at a destination on the appropriate cycle for that destination to receive the packet and at a time where it crosses an SMS on a desired cycle to place it on the correct in link where there are multiple inbound links that are processed in a round robin or similar scheme. The responsibility for determining the correct timing for insertion of the packet lies with the agent, which has knowledge of the hetero-mesh topology sufficient to insert packets at the correct timing to reach their respective destinations.

A check is first made whether the packet must cross or traverse a SMS to reach its destination (Block 603) (i.e., in this context, the packet would traverse an SMS from a split link to a lone link). If the packet does not need to cross an SMS a check is made whether it is possible that the packet may bounce at its destination (i.e., the destination is unable to process it when it arrives and places it back on (or doesn't take it off) the mesh interconnect causing it to circle the ring to come back to that destination (Block 605). If the packet is not bounceable at the destination, then a check is made whether the current slot is empty on the mesh interconnect (Block 607). If the slot is empty, then the packet is inserted with a destination address and packet data using protocol formats such as quick path interconnect (QPI) by Intel for communication with memory or other processors and in-die interconnect (IDI) formats for communication with other tiles (Block 609). If the slot is not empty, the process may wait until a next clock cycle to attempt to insert until a slot opens up (Block 611).

In a case where a packet not traversing an SMS on the way to its destination is bounceable at the destination, then a check is made whether bouncing the packet at the destination will cause the packet to traverse an SMS (Block 613). If the packet will not traverse an SMS where a bounce occurs, then the process proceeds to look for an empty slot each cycle to insert the packet (Blocks 607-611). However, if the packet may bounce and cause it to traverse an SMS, then the packets is treated as though the destination causes it to traverse an SMS.

Where a destination of the packet causes it to traverse an SMS or where bouncing may cause the packet to traverse an SMS, then the process checks whether the round robin counter of the split link group (SLG) of the SMS to be traversed allows the source tile to insert in the current clock cycle (Block 615). In other words, if the packet is inserted by the source on the current cycle will it reach the SMS on the correct cycle that will correspond to the SLG link of the arriving packet. If the current cycle timing is correct, then the process determines whether the current slot is empty (Block 617). In other embodiments, additional rules or logic may be implemented that further limit the timing of the sending of the packet, however, such rules can be added to this process in a manner understood by those skilled in the art. If the mesh slot is empty, then the packet is inserted (Block 619) with a format of QPI, IDI or similar format.

If the current cycle does not correspond to a correct SLG round robin arrival cycle or the mesh slot is not empty, then the process waits another cycle (Block 621) and may continue to wait cycles where these conditions are tested and do not hold to be true.

Figure 6B:
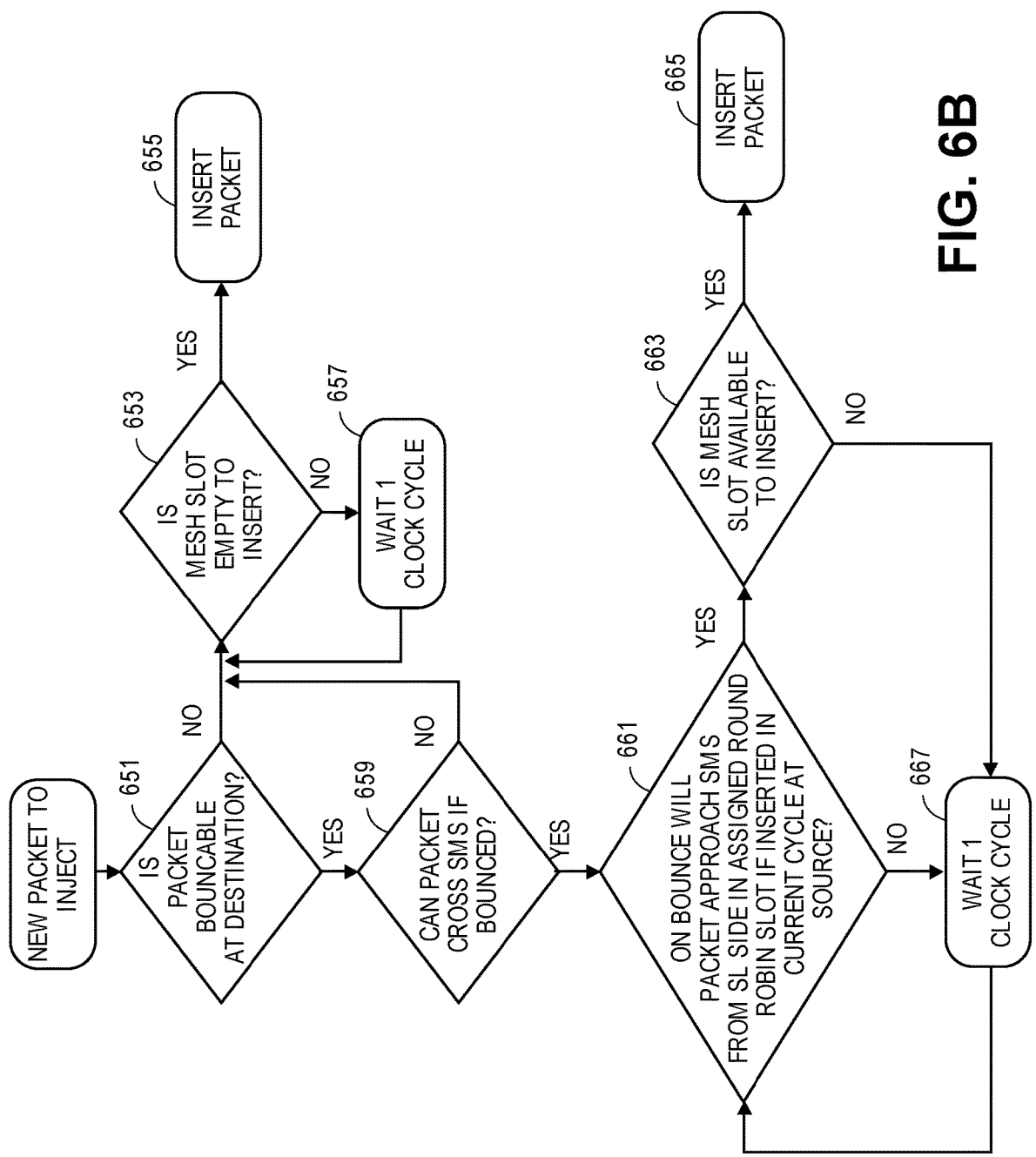
FIG. 6B is a flowchart of one embodiment of a process for a tile sending a message from a less dense portion of the hetero-mesh to a denser portion of the hetero-mesh.

FIG. 6B is a flowchart of one embodiment of a process for a tile sending a message from a less dense portion of the hetero-mesh to a denser portion of the hetero-mesh. This process is also initiated when there is a new packet to inject. The process can be implemented by an agent or similar component of the sending tile that manages the sending of packets to other cores or components via the mesh interconnect. The agent is responsible for inserting the packet onto the interconnect such that it will arrive at a destination on the appropriate cycle for that destination to receive the packet. However, since packets can always seamlessly traverse from the LL to the distributed SL in the SLG, the packet from the source in this case is not constrained by the SMS itself to insert packets in particular slots, unless the packet is bounceable and thus may need to circle around and cross the SMS in the other direction as well. The responsibility for determining the correct timing for insertion of the packet lies with the agent, which has knowledge of the hetero-mesh topology sufficient to insert packets at the correct timing to reach their respective destinations.

A check is first made whether it is possible that the packet may bounce at its destination (i.e., the destination is unable to process it when it arrives and places it back on (or doesn't take it off) the mesh interconnect causing it to circle the ring to come back to that destination (Block 651). If the packet is not bounceable at the destination, then a check is made whether the current slot is empty on the mesh interconnect (Block 653). If the slot is empty, then the packet is inserted with a destination address and packet data using protocol formats such as QPI, IDI or similar formats (Block 655). If the slot is not empty, the process may wait until a next clock cycle to attempt to insert until a slot opens up (Block 657).

In a case where the packet is bounceable at the destination, then a check is made whether bouncing the packet at a destination will cause it the packet to traverse an SMS (Block 659). If the packet will not traverse an SMS where a bounce occurs, then the process proceeds to look for an empty slot each cycle to insert the packet (Blocks 653-657). However, if the packet may bounce and cause it to traverse an SMS, then the packets is treated as though the destination causes it to traverse an SMS.

Where a destination of the packet causes it to traverse an SMS due to bouncing at the destination, then the process checks whether the packet will approach an SMS from the split link side in an assigned round robin timing if inserted in the current cycle by the source (Block 661). In other words, if the packet is inserted by the source on the current cycle and after being bounced by the destination circles around then approaches the SMS from the higher density split link side, will it reach the SMS on the cycle that will correspond to the packet being accepted by the SMS to transfer to the Lone Link side. If the current cycle timing is correct, then the process determines whether the current slot is empty (Block 663). In other embodiments, additional rules or logic may be implemented that further limit the timing of the sending of the packet, however, such rules can be added to this process in a manner understood by those skilled in the art. If the mesh slot is empty, then the packet is inserted (Block 665) with a format of QPI, IDI or similar formats.

If the current cycle does not correspond to a correct round robin arrival cycle or the mesh slot is not empty, then the process waits another cycle (Block 667) and may continue to wait cycles where these conditions are tested and do not hold to be true.

Figure 7:
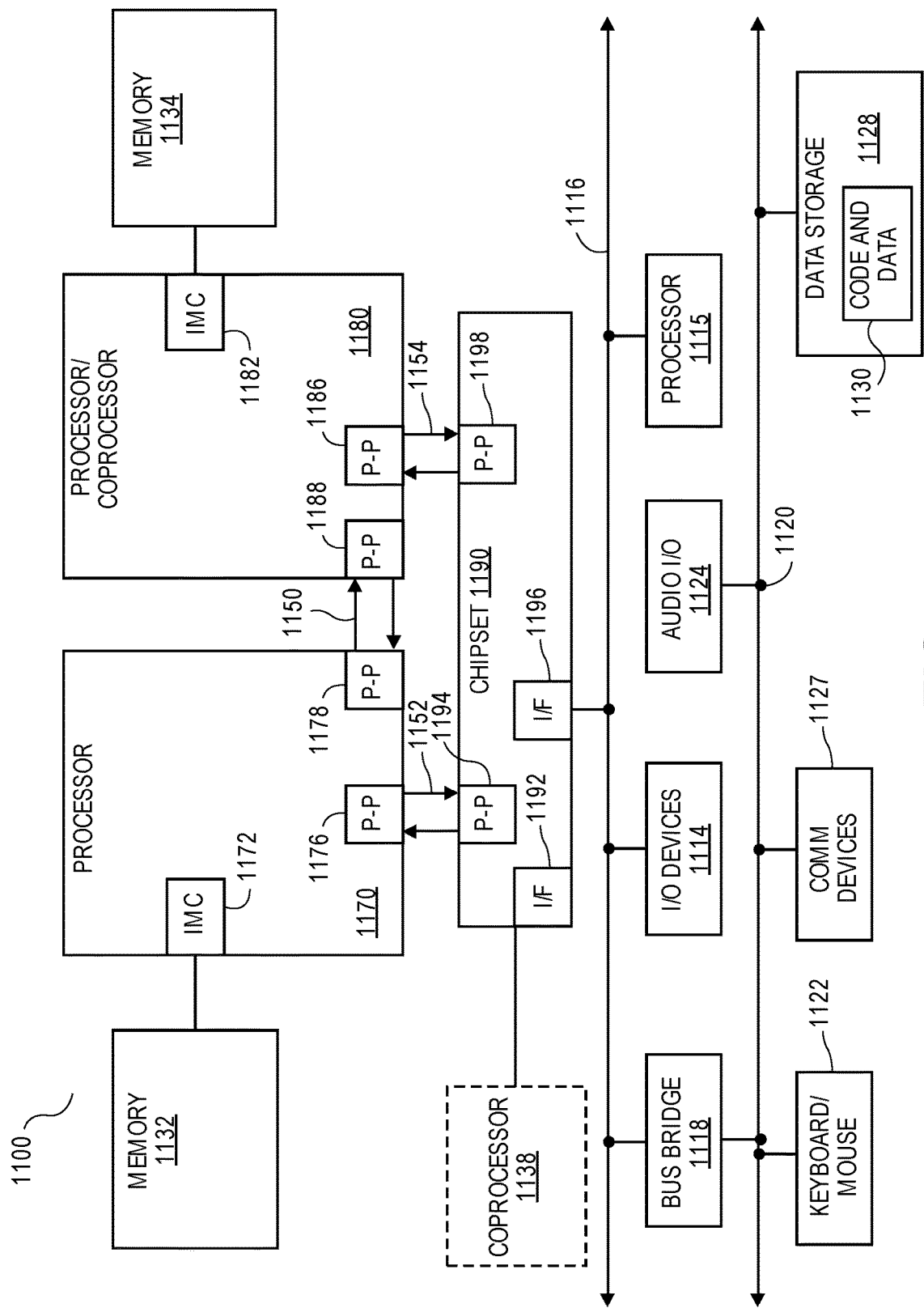
FIG. 7 is a block diagram of a second system 1100 in accordance with an embodiment of the present invention.

FIG. 7 is a block diagram of a second system 1100 in accordance with an embodiment of the present invention. As shown in FIG. 7, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, some embodiment may be implemented within the QPI architecture.

While shown with only two processors 1170, 1180, it is to be understood that the scope of the present invention is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 7, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 7, various I/O devices 1114 are coupled to first bus 1116, along with a bus bridge 1118 which couples first bus 1116 to a second bus 1120. In one embodiment, second bus 1120 includes a low pin count (UPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 7, a system may implement a multi-drop bus or other such architecture.

The flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
   receiving a packet to inject to a mesh interconnect by a component of a tile of a multi-core processor having a hetero-mesh topology, the hetero-mesh topology having a first region and a second region, the second region with a tile density sparser than the first region; and
   injecting the packet to the mesh interconnect by the tile in the first region where a current cycle of the mesh interconnect corresponds to a cycle of a split merge switch (SMS) that enables the packet to traverse the SMS to the second region of the hetero-mesh topology.

2. The method of claim 1, further comprising:
   determining whether a current slot of the mesh interconnect is empty.

3. The method of claim 2, further comprising:
   waiting to a next cycle, where the current slot of the mesh interconnect is not empty.

4. The method of claim 1, further comprising:
   determining whether the packet must traverse the SMS.

5. The method of claim 1, further comprising:
   determining whether the packet is bounceable at a destination of the packet; and
   determining whether the packet will traverse the SMS upon bouncing at the destination.

6. A method comprising:
   receiving a packet to inject to a mesh interconnect by a component of a tile of a multi-core processor having a hetero-mesh topology; and
   injecting the packet to the mesh interconnect by the component where a current cycle of the mesh interconnect corresponds to a cycle of a split merge switch (SMS) that enables the packet to traverse the SMS by a link of a split link group corresponding to a destination of the packet into a region of the hetero-mesh topology with a tile density greater than the region of the tile.

7. The method of claim 6, further comprising:
   determining whether a current slot of the mesh interconnect is empty.

8. The method of claim 7, further comprising:
   waiting to a next cycle, where the current slot of the mesh interconnect is not empty.

9. The method of claim 6, further comprising:
   determining whether the packet is bounceable at a destination of the packet.

10. The method of claim 6, further comprising:
    determining whether the packet will traverse the SMS upon bouncing at the destination.

11. An apparatus comprising:
    a core processor to process instructions and data; and
    an agent coupled to the core processor, the agent to enable communication with the core processor via a mesh interconnect, the agent to determine a cycle to inject outbound packets to the mesh interconnect, where a cycle to inject the packet is selected where the cycle of the mesh interconnect corresponds to a cycle of a split merge switch (SMS) that enables the packet to traverse the SMS to a processor sparser region of a hetero-mesh topology than the region of the core processor.

12. The apparatus of claim 11, wherein the agent to determine whether a current slot of the mesh interconnect is empty before injecting the packet.

13. The apparatus of claim 12, wherein the agent to wait to a next cycle, where the current slot of the mesh interconnect is not empty before injecting the packet.

14. The apparatus of claim 12, wherein the agent to determine whether the packet must traverse the SMS.

15. The apparatus of claim 11, wherein the agent to determine whether the packet will traverse the SMS upon bouncing at a destination.

16. An apparatus comprising:
    a core processor to process instructions and data; and
    an agent coupled to the core processor, the agent to enable communication with the core processor via a mesh interconnect, the agent to receive a packet to inject to the mesh interconnect, and determine a cycle to inject the packet to the mesh interconnect where the cycle of the mesh interconnect corresponds to a cycle of a split merge switch (SMS) that enables the packet to traverse the SMS to link of a split link group corresponding to a destination of the packet into a processor denser region of a hetero-mesh topology than the region of the core processor.

17. The apparatus of claim 16, wherein the agent to determine a next cycle, where a current slot of the mesh interconnect is not empty in which to inject the packet.

18. The apparatus of claim 16, wherein the agent determines an SMS arrival cycle according to a round robin scheme of the SMS.

19. The apparatus of claim 16, wherein the agent to determine whether the packet is bounceable at a destination of the packet.

20. The apparatus of claim 16, wherein the agent to determine whether the packet will traverse the SMS upon bouncing at the destination.

* * * * *